July 25, 1944.                J. R. ORELIND                2,354,274
                         AGRICULTURAL IMPLEMENT
                      Filed April 20, 1942           2 Sheets-Sheet 1
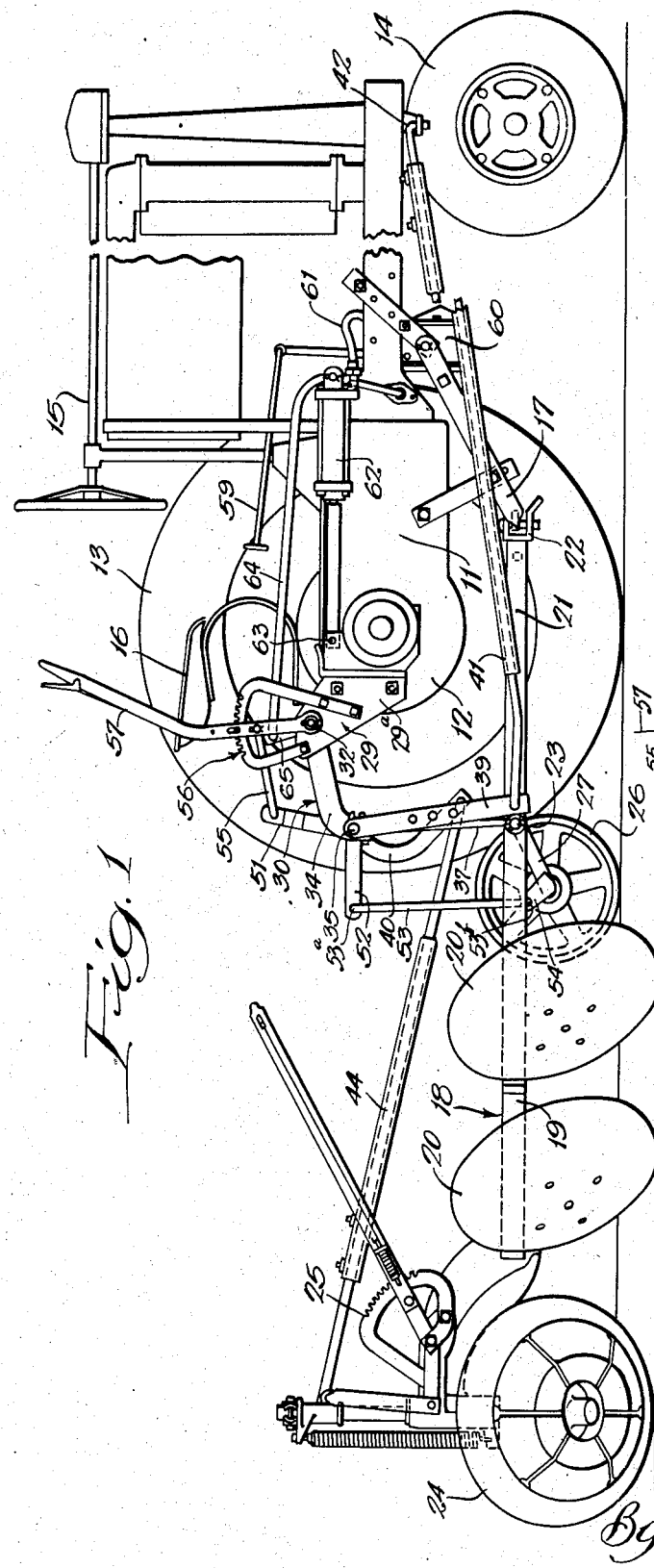
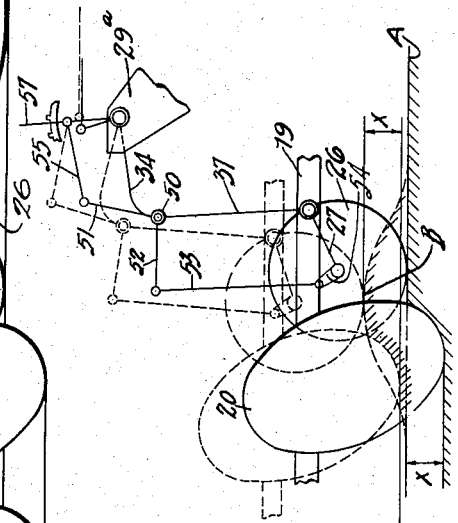
Inventor:
John R. Orelind,
By Paul O. Pippel,
Attorney.

July 25, 1944. J. R. ORELIND 2,354,274
AGRICULTURAL IMPLEMENT
Filed April 20, 1942 2 Sheets-Sheet 2
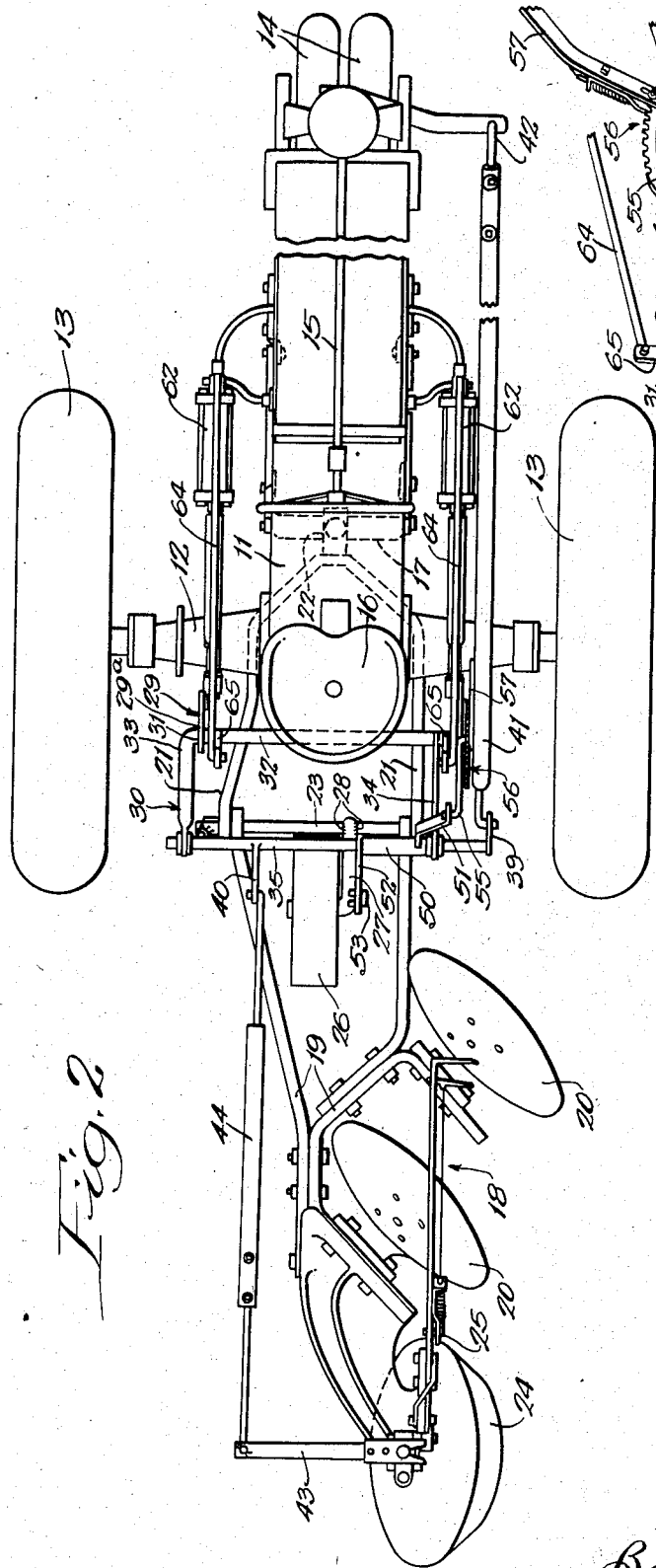

Patented July 25, 1944

2,354,274

UNITED STATES PATENT OFFICE 2,354,274

AGRICULTURAL IMPLEMENT

John R. Orelind, Wilmette, Ill., assignor to International Harvester Company, a corporation of New Jersey Application April 20, 1942, Serial No. 439,713

11 Claims. (Cl. 97—47)

This invention relates to agricultural implements and more particularly to adjusting mechanism for regulating the working depth of the working tools thereof.

It is an object of the present invention to provide means for adjusting a gauge wheel on an implement connected to a tractor or tool-supporting structure for free vertical and free lateral movement with respect thereto from an adjusting mechanism located on the tractor and removed from the implement, wherein the adjustment of the working tool with respect to the gauge wheel is unaffected as the gauge wheel traverses the contour of the ground.

It is still another object to provide a means for connecting the gauge wheel on the vertically and laterally movable implement with the adjustable mechanism on the tractor which may be carried by the combined lifting and stabilizing structure ordinarily connected between the tractor and implement and cooperable with the same to obtain the desired effect of maintaining the working tool in the proper relationship with the gauge means as the gauge means traverses the contour of the ground, and wherein a simplification of the mechanism designed to effect these results is obtained.

According to the present invention, there is provided on the tractor a manually adjustable mechanism and on the implement, which is connected to the tractor for free vertical and free lateral movement with respect thereto, a gauge wheel with respect to which the tool frame carrying the working tool is adjustable. Between the implement and the tractor or tool-supporting structure is connected a combined lateral stabilizing and lifting structure which serves not only to laterally stabilize the tool frame on its single supporting wheel but also serves as a means through which power is transmitted for the purpose of raising the tool frame about its supporting wheel to lock the implement into its transport position on the tractor. This combined stabilizing and lifting structure forms a supporting means for connecting parts extending between the manually adjustable mechanism on the tractor and the gauge wheel on the implement. These parts are arranged with respect to the parts of the stabilizing structure to provide a double parallelogram linkage arrangement so that as the gauge wheel follows the contour of the ground the working tool is always maintained in its proper adjusted position with respect to the gauge wheel. The adjustable mechanism on the tractor includes a manually adjustable lever, and it remains in a relatively fixed location accessible to the operator of a tractor at all times and is not left on the implement to wobble and interfere with the lateral swinging movement of the implement by engagement of the lever with some portion of the tractor while the tractor and implement are at work in the field.

For other objects and for a better understanding of the invention reference may be had to the following detailed description taken in connection with the accompanying drawings, in which:

Figure 1 is a side elevational view of a tractor and of an implement connected thereto with the adjusting arrangement embodying the features of the present invention;

Figure 2 is a plan view of the tractor and of the implement;

Figure 3 is a fragmentary perspective view of the implement and of the connecting parts carried by the stabilizing structure and illustrating more clearly the essence of the present invention; and Figure 4 is a diagrammatic view of the connecting parts and of the stabilizing structure and illustrating the relative positions of the same as the implement moves vertically upon following the ground contour.

Referring now to the drawings, there is shown a tractor or tool-supporting structure 11 having a rear portion 12 supported on rear traction wheels 13. The forward end of the tractor is supported on dirigible wheels 14 controllable by a steering mechanism 15 accessible to an operator's station 16 on the rear portion 12 of the tractor.

To the tractor is rigidly connected a connecting structure 17 adapted for the connection to the tractor of various implements. To this connecting structure 17 is connected a ground-working implement 18 having a tool-carrying frame 19 with tools 20 thereon and a connecting draft frame or structure 21 adapted to be attached to the connecting structure 17 by a clevis arrangement 22. The tool-carrying frame 19 and draft frame 21 are pivotally connected together by means of a transversely extending shaft 23 and can buckle vertically with respect to each other. The rear portion of the tool frame 19 is supported on a single pivotable supporting wheel 24 adapted to be vertically adjusted with respect to the frame 19 by a manually adjustable mechanism 25. As the draft structure 21 and the tool frame 19 buckle about the transverse shaft 23, the tool frame pivots about the single supporting wheel 24.

In order to gauge the working depth of the tools 20 on the main tool frame 19, there is provided a gauge wheel 26 which is connected to the transverse shaft 23 by an arm 27. This arm 27 is rigidly connected to the transverse shaft 23 as indicated by the welded union 28.

To the rear portion 12 of the tractor is connected a vertically extending bracket structure 29 having laterally spaced vertically extending attaching members 29a between which extends a combined rockable stabilizer and lifting structure 30 journaled respectively in a manner as indicated at 31. This structure includes a rock-shaft portion 32 rockable in the journaled connections with the bracket structure 29 and having rearwardly extending arms 33 and 34 laterally spaced thereon. Between the rearward ends of these arms 34 extends a rotatable shaft 35 from which are hung laterally swingable links 36 and 37 connected respectively to the outer ends of the transverse shaft 23. These swingable links 36 and 37 are so connected between the shafts 35 and 23 that free lateral swinging movement of the tool frame is had, the amount of swinging movement being limited only by a diagonally extending limiting structure 38. It should now be apparent that the combined structure 30 serves as a stabilizing arrangement for maintaining the tool frame 19 upright on its single supporting wheel 24 to thereby maintain the frame with its tools 20 in a lateral plane.

Rigidly connected to the shaft 35 are arms 39 and 40. The arm 39 is connected by a forwardly extending connecting member 41 with the steering mechanism 15 as indicated at 42, whereby movement of the steering mechanism is imparted rearwardly and through the shaft 35 to the arm 43 on the single laterally pivotable supporting wheel 24 by a link 44. By this means the single supporting wheel 24 is steered simultaneously with the dirigible wheels 14.

It should now be apparent that if an adjusting mechanism for the gauge wheel were to be provided on the implement, which is movable with respect to the tractor, that its manual adjusting lever would bounce about and would seldom be located in one location with respect to the operator's station as the tractor and its implement passed over the ground. Hence, the means to be presently described has been provided whereby the adjusting lever can be located on the tractor and be always accessible to the operator's station 16.

Accordingly, there has been provided on the shaft 35, a sleeve 50 rotatable thereon having a vertically extending arm 51 and a rearwardly extending arm 52 connected by means of a link 53 to a strap 54 on the arm 27 serving to connect the gauge wheel 26 with the transverse shaft 23. It may be noted particularly from Figure 1 that the connecting link 53 is substantially parallel with the swingable links 37 and that likewise the arm 52 on the sleeve 50 is substantially parallel with a line drawn from the point of connection of the link 53 with the strap 54 to the point of connection of the arm 27 to shaft 23. These elements as arranged thus take the form of a parallelogram. As the gauge wheel 26 rides over the ground, the frame 19 with its tools 20 will also ride up and down or float vertically. Also the rockable structure 30 will ride up and down, but since the arm 51 is connected by means of a link 55 to an adjustable mechanism 56 on the bracket structure 29 and having a lever 57 accessible to the operator's station 16, the sleeve 50 in addition to moving vertically with the structure 30 will merely pivot about the shaft 35. The lever 57, forming a part of the adjustable mechanism 56, is pivoted on the rock-shaft portion 32 in alinement with its journaled connection 31 with the vertically extending bracket structure 29. It should thus be further noted that all of the connecting parts between the adjustable mechanism 56 and the gauge wheel arm 27 have a parallel relationship with parts of the combined stabilizing and lifting structure 30. The link 55 is substantially parallel with the arms 34, and the arm 51 of the sleeve is substantially parallel with the lever 57. These parts thus provide for a second parallelogram arrangement, and this arrangement is connected through the sleeve with the first-mentioned parallelogram arrangement connected with the gauge wheel 26, and by this combination of double parallelogram arrangements, the adjusted relationship between the gauge wheel 26 and the working tools 20 is always maintained as the frames move vertically to follow irregularities of the ground. In Figure 4, this action is illustrated with a showing in full lines of the gauge wheel passing over the ground of one contour A, with the adjusted distance between the gauge wheel and the working tool being indicated at X. Assuming that the frame 19 and its tool 20 have been moved vertically on a contour B, as shown in dotted lines, the distance between the tool and the gauge wheel will still be X or the same. The double parallelogram arrangement makes possible the keeping of the adjustment made by the lever 57. The lever when adjusted stays fixed and the arrangement reacts with respect to the same.

The connection of the ends of the link 53 respectively with the arm 52 and the strap 54, as indicated respectively at 53a and 53b, is such as to provide sufficient looseness of the link 53 so that free lateral movement of the frame may be had. This link is, accordingly, laterally spaced with respect to the laterally swingable links 37, and hence due to the parallelism of all of these links in a transverse plane the gauge wheel will accordingly be kept at the proper setting as the implement shifts freely from side to side. The arrangement is thus such that the gauge wheel is controlled regardless of whether the tool frame floats vertically or shifts from side to side.

When lifting of the implement frame about the supporting wheel 24 is desired, this is effected by the operator moving a controlling element 59 serving to cause fluid to flow from a fluid pressure source 60 through fluid communications 61 to single-acting fluid motors 62 located respectively at opposite sides of the tractor and adapted to react against the rear portion 12 of the tractor as indicated at 63 and to carry forwardly with the same connecting rods 64 which are in turn connected to arms 65 on the rockable structure 30. As these fluid motors 62 are extended, the rockable structure 30 will be rocked in a clockwise direction and lifting movement will be imparted through its links 37 to the shaft 23 to thereby lift the frame 19 about the supporting wheel 24.

It should now be apparent that there has been provided a means for connecting a manually adjustable mechanism on a tractor to adjust a gauge wheel on the movable implement frame, whereby, by virtue of its parts in relationship to the stabilizing and lifting structure, a constant relationship is maintained between the working tool 20 and the gauge wheel 26 irrespective of its movement over the contour of the ground, and wherein these parts utilize the parts of the combined structure, thereby minimizing the number of parts necessary for the attachment giving this result.

While various changes may be made in the detail construction, it shall be understood that such changes shall be within the spirit and scope of the present invention as defined by the appended claims.

What is claimed is:

1. In combination, a tool-supporting structure, a working tool frame connected to the tool-supporting structure for free movement with respect thereto, means on the tool-supporting structure for moving the said working tool frame with respect thereto, means on the working tool frame adapted for adjustment with respect thereto, means connected between the tool-supporting structure and the means on the working tool frame adapted for adjustment for maintaining the relative adjustment of the latter with respect to the working tool frame as the working tool frame moves with respect to the tool-supporting structure, and separate adjustable means associated with the maintaining means for effecting the adjustment of the means on the tool frame adapted for adjustment with respect to the working tool frame, said adjustable means being independently operable with respect to the means for moving said working tool frame with respect to said tool-supporting structure.

2. In combination, a tool-supporting structure, a working tool frame connected to the tool-supporting structure for free movement with respect thereto, means on the working tool frame adapted for adjustment with respect thereto, and a double parallelogram arrangement connected between the tool-supporting structure and the means on the tool frame adapted for adjustment with respect thereto for maintaining the relative adjustment of the latter with respect to the working tool frame as the working tool frame moves with respect to the working tool structure.

3. In combination, a tool-supporting structure, a working tool frame with a ground-working tool thereon connected to the tool-supporting structure for substantially free movement with respect thereto while in the ground-working position, gauging means connected to the working tool frame for adjustment with respect to the ground-working tool, a double parallelogram arrangement connected between the gauging means and the tool-supporting structure for maintaining the relative adjustment of the gauging means with respect to the working tool, and adjustable means associated with the maintaining means for adjusting the gauging means with respect to the working tool.

4. In combination, a tool-supporting structure, a working tool frame having a working tool thereon, means for connecting the tool frame to the tool-supporting structure for free movement with respect thereto in its working position, adjustable gauge means carried by the tool-supporting structure and adapted to gauge the working position of the working tool while following the contour of the ground, means on the tool-supporting structure for moving the said working tool frame with respect thereto, adjustable means on the tool-supporting structure independently operable with respect to the tool frame moving means, for effecting independent adjustment of the gauge means with respect to said tool frame, and means for connecting the adjustable means on the tool-supporting structure with adjustable gauge means on the tool frame so that the relative adjusted position of the gauge means with respect to the working tool is maintained throughout the range of movement of the working tool frame while in its working position.

5. In combination, a tool-supporting structure, a working tool frame having a working tool thereon, means for connecting the tool frame to the tool-supporting structure for vertical movement from one position to another position, means for gauging the working tool in one of its positions, means for moving the tool frame from one position to another position, said moving means including parts extending between the tool frame and the tool-supporting structure, means independent of said moving means for adjusting the gauging means including a lever carried on the tool-supporting structure and connecting parts between the lever and the gauging means, and said connecting parts being carried by the frame moving means.

6. In combination, a tool-supporting structure, a working tool frame having a working tool thereon, means for connecting the working tool frame to the tool-supporting structure for vertical movement from one position to another position, means for gauging the working tool in one of its positions, means for moving the tool frame from one position to another position, said moving means including parts extending between the tool frame and the tool-supporting structure, means for adjusting the gauging means including a lever carried on the tool-supporting structure, connecting parts between the lever and the gauging means, and said connecting parts being carried by the frame moving means, said moving means including a rockable crank arm structure and connecting links extending between the tool frame and the tool-supporting structure, the said adjusting means taken with the moving means arranged to provide a double parallelogram arrangement between the tool structure and gauging means whereby the adjusted relationship of the gauging means with the working tool is maintained as the contour of the ground is followed by the ground gauging means.

7. In combination, an implement-supporting structure, a ground-working implement having a tool-carrying frame with a ground-working tool thereon, and a draft structure for connecting the tool-carrying frame to the implement-supporting structure, said tool-carrying frame and said draft structure connected together for free vertical buckling movement with respect to each other, a single supporting wheel on the rear end of the tool frame about which the latter is pivoted when the tool-carrying frame and the draft structure are buckled, a lateral stabilizing structure carried by the implement-supporting structure and connected to the implement to laterally stabilize the same on its single supporting wheel, a gauge wheel on the implement for gauging the ground-working depth of the ground-working tool, an adjustable mechanism on the implement-supporting structure, and means carried by the lateral stabilizing structure for connecting the gauge wheel on the implement to the adjustable mechanism on the implement-supporting structure to be adjusted by the same.

8. In combination, an implement-supporting structure, a ground-working implement having a tool-carrying frame with a ground-working tool thereon and a draft structure for connecting the tool-carrying frame to the implement-supporting structure, said tool-carrying frame and said draft structure being connected together for free vertical buckling movement with respect to each other, a single supporting wheel on the rear end of the tool frame about which the latter is pivoted when the tool-carrying frame and the draft structure are buckled, a lateral stabilizing structure carried by the implement-supporting structure and connected to the implement to laterally stabilize the same on its single supporting wheel, a gauge wheel on the implement for gauging the ground-working depth of the ground-working tool, an adjustable mechanism on the implement-supporting structure, and means forming a double parallelogram linkage arrangement when taken with the lateral stabilizing structure for connecting the gauge wheel to the adjustable mechanism on the implement-supporting structure whereby the relationship of the gauge means with the working tool is maintained as the gauge wheel follows the contour of the ground.

9. In combination, a tractor having a rear portion, a disc plow having a main disc-carrying frame with plowing discs thereon and a draft structure pivotally connected with the disc-carrying frame, said draft structure connected to the tractor forwardly of the rear portion thereof, a single supporting wheel connected to the main frame for supporting the same, a rockable combined stabilizing and lifting structure carried by the rear portion of the tractor and connected to the main frame at laterally spaced locations thereon, power means for rocking said rockable structure to effect lifting of the disc-carrying frame about its supporting wheel to a transport position, a gauge wheel on the plow for gauging the ground-working depth of the plow discs, means for adjusting the gauge wheel to vary the working depth of the plowing discs including a manually adjustable mechanism carried on the tractor, arm means pivotally connected to the rockable structure, and links for respectively connecting the arm means with the gauge wheel and the manually adjustable mechanism, whereby said gauge wheel may be adjusted by manual means located on the tractor.

10. In combination, a tractor having a rear portion, a ground-working implement having a main tool-carrying frame and a draft frame pivotally connected to the tool-carrying frame for vertical buckling movement, said draft frame connected to the tractor forwardly of the rear portion thereof, a single supporting wheel connected to the main tool-carrying frame, a transversely extending shaft for pivotally uniting the main and draft frames and having a supporting arm thereon, a gauge wheel carried on the supporting arm, a stabilizing structure pivotally carried on the rear portion of the tractor and connected to the transversely extending shaft, said stabilizing structure including a rearwardly extending rockable structure and laterally spaced links depending from the rockable structure for connection with the transverse pivot shaft, a manually adjustable mechanism on the tractor having a lever pivoted on the tractor on substantially the same pivot with the stabilizing structure, means for connecting the lever with the gauge wheel supporting arm and including a rockable element having arms thereon and pivoted on the rearward end of the stabilizing structure at a point in alinement with the connection of the spaced links therewith, a link element running generally parallel with the rearwardly extending portion of the pivotable stabilizing structure and connected between the lever and one of the arms of the rockable element, a second link element running generally parallel with the spaced links and connected between the gauge wheel supporting arm and the other arm of said rockable element, the said link and rockable elements thereby being so arranged in parallelism with the stabilizing structure that the adjusted position of the gauge wheel relative to the disc tool will be maintained throughout the range of vertical movement of the tool-carrying frame as the gauge wheel follows the ground contour.

11. In combination, a tool-supporting structure, a working tool frame having a working tool thereon, means connecting said tool frame to said tool-supporting structure, gauge means connected to said working tool frame for adjustment with respect to said working tool, means for moving said working tool to and from ground-working position, means on said tool-supporting structure independent of said working tool moving means, for adjusting said gauge means with respect to said working tool and means interconnecting said working tool moving means and said gauge means for maintaining the relative adjustment of said gauge means with respect to said working tool as said working tool is moved to and from ground-working position.

JOHN R. ORELIND.